(12) United States Patent
Strelic et al.

(10) Patent No.: US 11,267,309 B2
(45) Date of Patent: Mar. 8, 2022

(54) LOAD RELIEF CONTROL SYSTEM

(71) Applicant: Brandt Industries Inc., Regina (CA)

(72) Inventors: Raymond Strelic, Regina (CA); Brett Burke, Edmonton (CA); Anneke Snow, Regina (CA)

(73) Assignee: Brandt Industries Inc., Regina (CA)

( * ) Notice: Subject to any disclaimer, the term of this patent is extended or adjusted under 35 U.S.C. 154(b) by 184 days.

(21) Appl. No.: 16/736,016

(22) Filed: Jan. 7, 2020

(65) Prior Publication Data
US 2021/0206223 A1 Jul. 8, 2021

(51) Int. Cl.
*B60G 17/052* (2006.01)
*B62D 63/06* (2006.01)

(52) U.S. Cl.
CPC ....... *B60G 17/0525* (2013.01); *B62D 63/061* (2013.01); *B60G 2202/152* (2013.01); *B60G 2202/413* (2013.01); *B60G 2300/04* (2013.01); *B60G 2500/2021* (2013.01)

(58) Field of Classification Search
CPC ........ B60G 2300/04; B60G 2500/2021; B60G 17/0525; B62D 63/061
See application file for complete search history.

(56) References Cited

U.S. PATENT DOCUMENTS

| | | | | |
|---|---|---|---|---|
| 5,192,189 A * | 3/1993 | Murata | ............... | F16C 29/02 414/477 |
| 5,472,227 A * | 12/1995 | Schonfeld | .......... | B60G 17/0523 280/683 |
| 7,134,829 B2 * | 11/2006 | Quenzi | ................ | B60P 1/02 414/482 |
| 7,841,608 B2 * | 11/2010 | Morris | ............... | B60G 17/0523 280/124.16 |
| 7,950,675 B1 * | 5/2011 | Quenzi | ................ | B60P 1/027 280/6.157 |
| 8,317,215 B2 * | 11/2012 | Quenzi | ................ | B60P 3/122 280/425.1 |
| 10,040,331 B2 * | 8/2018 | Gandhi | ............... | F16K 31/602 |
| 2008/0246234 A1 * | 10/2008 | Krauss | ............... | B60G 17/0155 280/5.514 |
| 2010/0038868 A1 * | 2/2010 | Zork | .................... | B60G 9/003 280/5.514 |
| 2013/0207355 A1 * | 8/2013 | Pavuk | .................... | F16F 9/049 280/5.512 |
| 2015/0375666 A1 * | 12/2015 | Woods, Sr. | ............ | B60P 1/433 414/482 |
| 2017/0175781 A1 * | 6/2017 | Gratton | ............... | F15B 13/044 |
| 2018/0093602 A1 * | 4/2018 | Selzer | .................... | B60P 1/433 |
| 2018/0236839 A1 | 8/2018 | Rasner et al. | | |

FOREIGN PATENT DOCUMENTS

CA 2636513 A1 12/2009

\* cited by examiner

*Primary Examiner* — James A English
(74) *Attorney, Agent, or Firm* — Frost Brown Todd LLC; Nicole M. Tepe

(57) ABSTRACT

A suspension system is provided comprising at least one ride height valve, when engaged, that allows an air flow to engage a hydraulic control valve such that it initiates either extension or retraction of a hydraulic piston from a cylinder. Extension or retraction of the hydraulic piston causes a booster frame to be bias downwardly or upwardly, respectively. The ride height valve is engaged when a booster axle is at a predetermined distance from the frame.

20 Claims, 4 Drawing Sheets

LOAD RELIEF CONTROL SYSTEM

FIELD

The field relates to heavy haul trailers, and in particular to a booster for a heavy haul trailer.

BACKGROUND

Canadian Patent No. 2,636,513 to Aspen Custom Trailers, herein incorporated by reference in its entirety, discloses a suspension system for towed vehicles that automatically adjusts for different payloads and road conditions without the need for manual shims used in prior art suspensions. An electronic sensor, in combination with a controller, is employed that measures the ride height and causes the hydraulic cylinder to retract or extend according to the bias needed to maintain the suspension in the preferred ride height range. The controller includes a microprocessor in electrical communication with the sensor and with the hydraulic load biasing mechanism through a control line. However, the reliability of an electronic system is low given the harsh environment these units typically operate in.

United States Patent Application Publication No. 2018/0236839A1 to Superior Synchronized Systems LLC, herein incorporated by reference in its entirety, discloses a system that auto adjusts the shim by utilizing pressure transducers on the trailer and booster air suspension. The system continually monitors and compares the pressure in the load carrying trailer airbag system at a first transducer, and in the add-on-axle trailer airbag system at second transducer. A processor adjusts the shim based on the comparison.

SUMMARY

In a first aspect, a suspension system for a trailer and a load-sharing accessory vehicle is provided. The suspension system comprises an air ride suspension extending between a frame of the accessory vehicle and at least one axle of the accessory vehicle; a biasing mechanism between the trailer and the frame including at least one hydraulic cylinder and a piston for providing a bias between the trailer and the frame; a first ride height valve configured to allow a fluid, when engaged, flowing from a fluid source to engage a first hydraulic control valve thereby causing extension of the piston to increase the magnitude of the bias, the first ride height valve is directly or indirectly engaged by a first axle of the at least one axle when the first axle is at or greater than a first predetermined distance from the frame; and a second ride height valve configured to allow fluid, when engaged, flowing from the fluid source to engage a second hydraulic control valve thereby causing retraction of the piston to decrease the magnitude of the bias, the second ride height valve is directly or indirectly engaged by a second axle of the at least one axle when the second axle is at or less than a second predetermined distance from the frame.

Preferably, the first axle and the second axle are the same, and the fluid is air and the fluid source is an air source. The first predetermined distance and the second predetermined distance may define a preferred ride height range for the air ride suspension. The first predetermined distance is preferably greater than the second predetermined distance.

The first hydraulic control valve may cause extension of the piston by allowing a hydraulic fluid to enter the hydraulic cylinder thereby displacing the piston. The first hydraulic control valve may also cause extension of the piston by further engaging a pump that causes the hydraulic fluid to enter the hydraulic cylinder thereby displacing the piston.

The second hydraulic control valve may cause retraction of the piston by allowing a hydraulic fluid to exit the hydraulic cylinder thereby displacing the piston.

The suspension system may further comprise a third ride height valve configured to allow fluid, when engaged, flowing from the fluid source to engage a third hydraulic control valve thereby causing retraction of the piston to decrease the magnitude of the bias, the third ride height valve is directly or indirectly engaged by a third axle of the at least one axle when the third axle is at or less than a third predetermined distance from the frame. The first axle, the second axle and the third axle are preferably the same. It is also preferable that the fluid is air and the fluid source is an air source.

The second predetermined distance may be greater than the third predetermined distance.

The second hydraulic control valve may cause retraction of the piston by allowing a hydraulic fluid to exit the hydraulic cylinder at a first rate thereby displacing the piston. The third hydraulic control valve may cause retraction of the piston by allowing the hydraulic fluid to exit the hydraulic cylinder at a second rate thereby displacing the piston. Preferably, the second rate is greater than the first rate.

In a second aspect, a method for controlling the ride height of a load-sharing accessory vehicle attached to a trailer is provided. The load-sharing accessory vehicle includes a frame supported by at least one air ride suspension on at least one axle. The method comprises the steps of engaging a first ride height valve thereby allowing a fluid to engage a first hydraulic control valve; and extending a piston within a hydraulic cylinder, when the first hydraulic control valve is engaged, that provides a first magnitude of a bias to said frame in relation to said axle so as to adjust said ride height.

The method may further comprise the steps of engaging a second ride height valve thereby allowing a fluid to engage a second hydraulic control valve; and retracting the piston within the hydraulic cylinder, when the second hydraulic control valve is engaged, that provides a second magnitude of a bias to said frame in relation to said axle so as to adjust said ride height.

The method may yet further comprise the steps of engaging a third ride height valve thereby allowing a fluid to engage a third hydraulic control valve; and retracting the piston within the hydraulic cylinder, when the third hydraulic control valve is engaged, that provides a third magnitude of a bias to said frame in to said axle so as to adjust said ride height.

Preferably, the first magnitude of bias is greater than that the second magnitude of bias. It is also preferable that the first magnitude of bias is greater than that the second magnitude of bias and the second magnitude of bias is greater than that the third magnitude of bias.

The first ride height valve may be engaged when a first axle is at or greater than a first predetermined distance from the frame; the second ride height valve may be engaged when a second axle is at or less than a second predetermined distance from the frame; and the third ride height valve may be engaged when a third axle is at or less than a third predetermined distance from the frame.

The first axle, the second axle and the third axle are preferably the same.

The first predetermined distance and the second predetermined distance may define a preferred ride height range for the air ride suspension. Preferably, the first predetermined distance is greater than the second predetermined distance and the second predetermined distance is greater than the third predetermined distance.

DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

DETAILED DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the invention is not intended to be exhaustive or to limit the invention to the precise form of any exemplary embodiment. Accordingly, the description and drawings are to be regarded in an illustrative, rather than a restrictive, sense.

Figure 1:
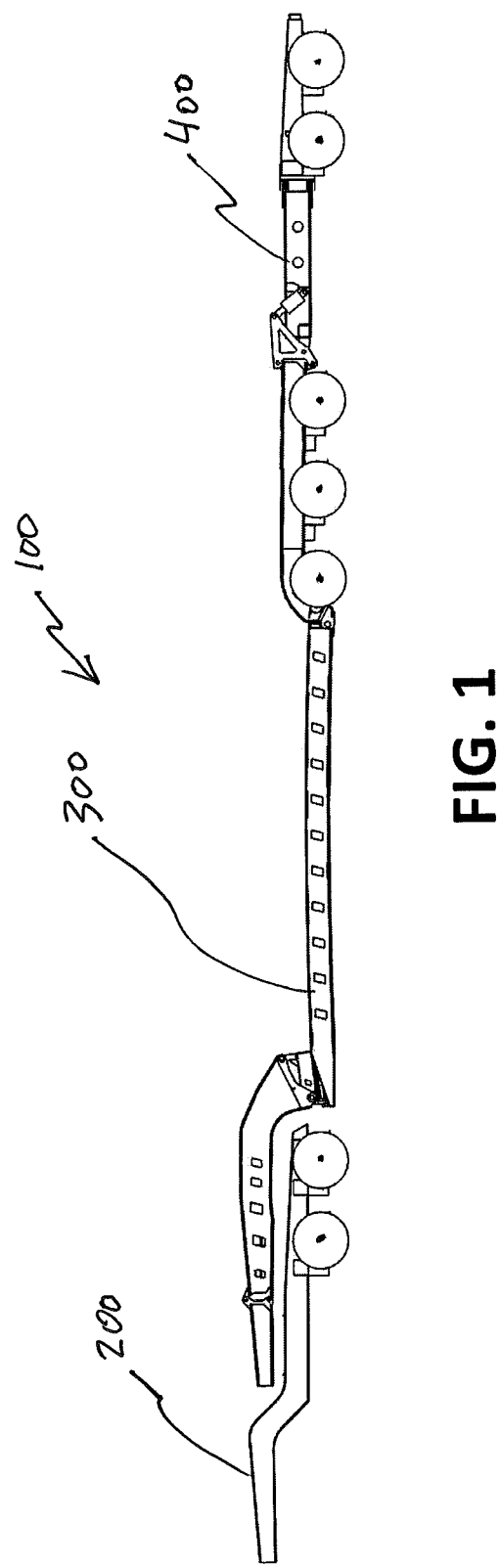
FIG. 1 is a side view of a trailer system with a booster.

In order for configurability and load distribution, a trailer system 100 may comprise a jeep 200, a trailer 300, and/or a booster 400 as shown in FIG. 1 The configuration may be determined in order to allow larger payloads to be carried by the trailer system 100 and as such one or more load divider dollies, such as a jeep 200 and/or a booster 400 may be coupled to the trailer 300. The trailer 300 may be a removable gooseneck lowboy trailer but may comprise other types of trailers.

Figure 2:
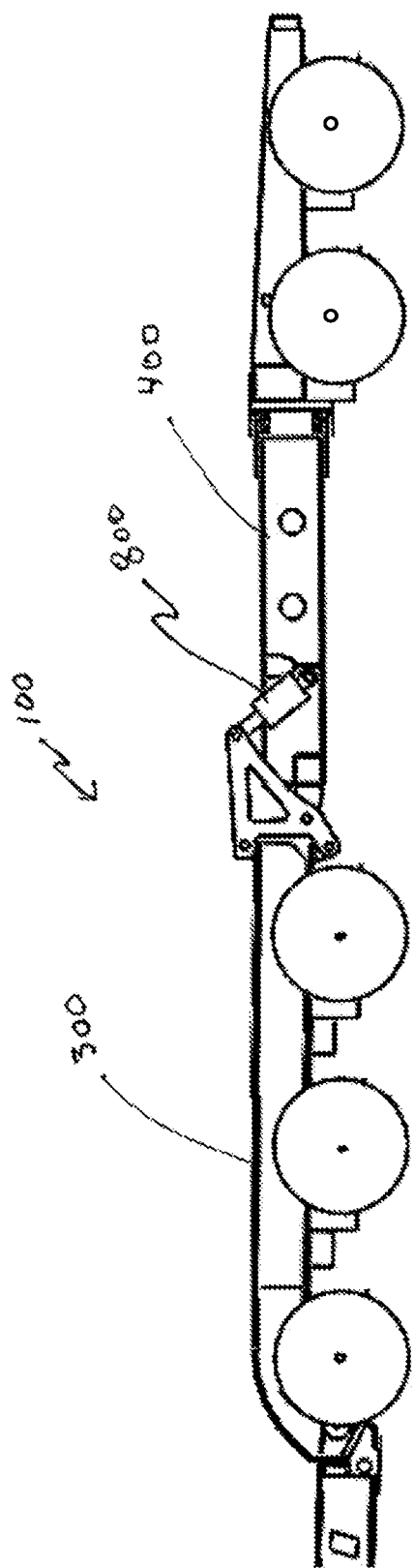
FIG. 2 is a side view of a trailer system with a booster and hydraulic shim system.

Due to the large distance between the axle groups, the joint between the trailer and the booster articulates to be able to properly transfer load to the booster axles. Typically, a shim controlled by hydraulic cylinders 800 will raise or lower the booster 400 about a horizontal axis to assist in distributing a load along a trailer system 100 as shown in FIG. 2.

The amount shim can be set manually to keep the suspensions in their operating ranges and prevent overloading of either axle group, but this is typically done before travel begins. In some cases, an operator of a booster manually adjusts the suspension system upon loading or unloading cargo so that the ride height falls within a preferred range by removing or inserting metal shims in the hydraulic bias system so as to increase or decrease the downward bias. The manual removal and insertion of shims according to the payload is time-consuming.

During travel, an auto shim system is required to adjust rapidly should a "bridging" event occur whereby the trailer axles are in a low spot and the booster axles rapidly assume a large portion of the load. Should bridging occur, with no weight on the trailer axles, the booster could potentially steer the trailer into a ditch. Numerous auto shim systems have been developed in an effort to rapidly adjust and prevent this event.

It has been found, however, that the prior art systems that auto adjust the shim suffer from drawbacks such as undue expense and complexity. In addition, the reliability of an electronic system is low given the harsh environment these units operate in.

What is needed, therefore, is an auto-shim system that is relatively simple and robust in construction.

Figure 3:
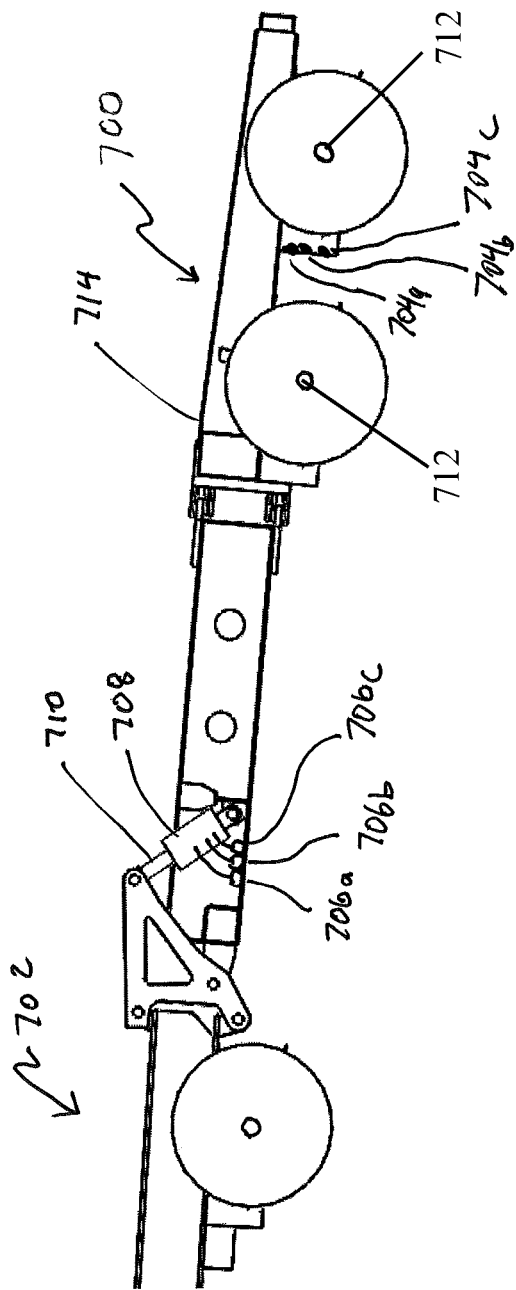
FIG. 3 is side view of the present invention wherein a piston is extended from a hydraulic cylinder.
Figure 4:
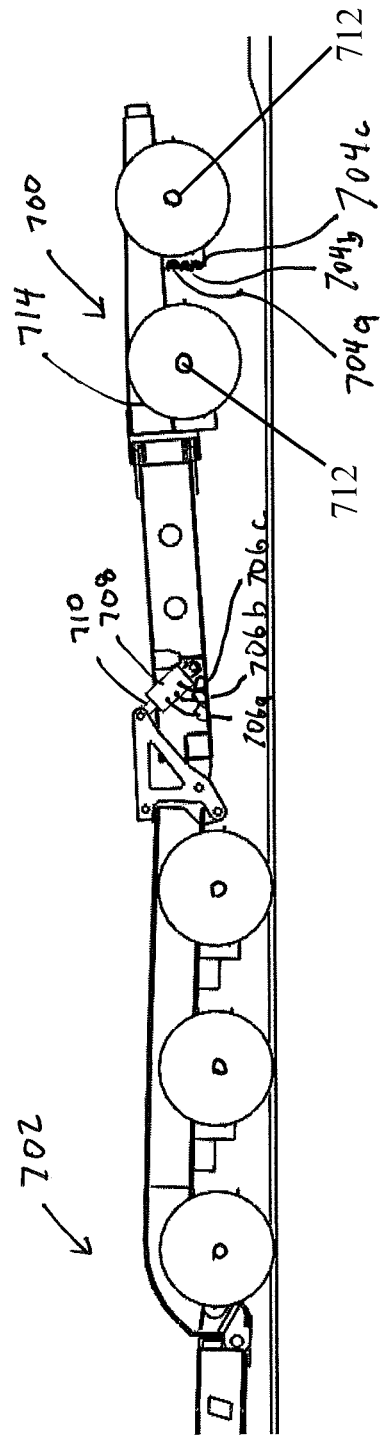
FIG. 4 is side view of the present invention wherein a piston is retracted into a hydraulic cylinder.

FIGS. 3 and 4 illustrate the suspension system for a booster 700, attached to a trailer 702, according to the preferred embodiment comprises a hydraulic load biasing mechanism, an air suspension mechanism, ride height valves 704a, 704b, 704c and hydraulic control valves 706a, 706b, 706c located on the booster 700. The hydraulic load biasing mechanism includes at least one hydraulic cylinder 708 having a piston 710, and the air suspension mechanism consists of one or more air bags (not shown) extending between a frame 714 and an axle 712 of the of the booster 700.

Figure 5:
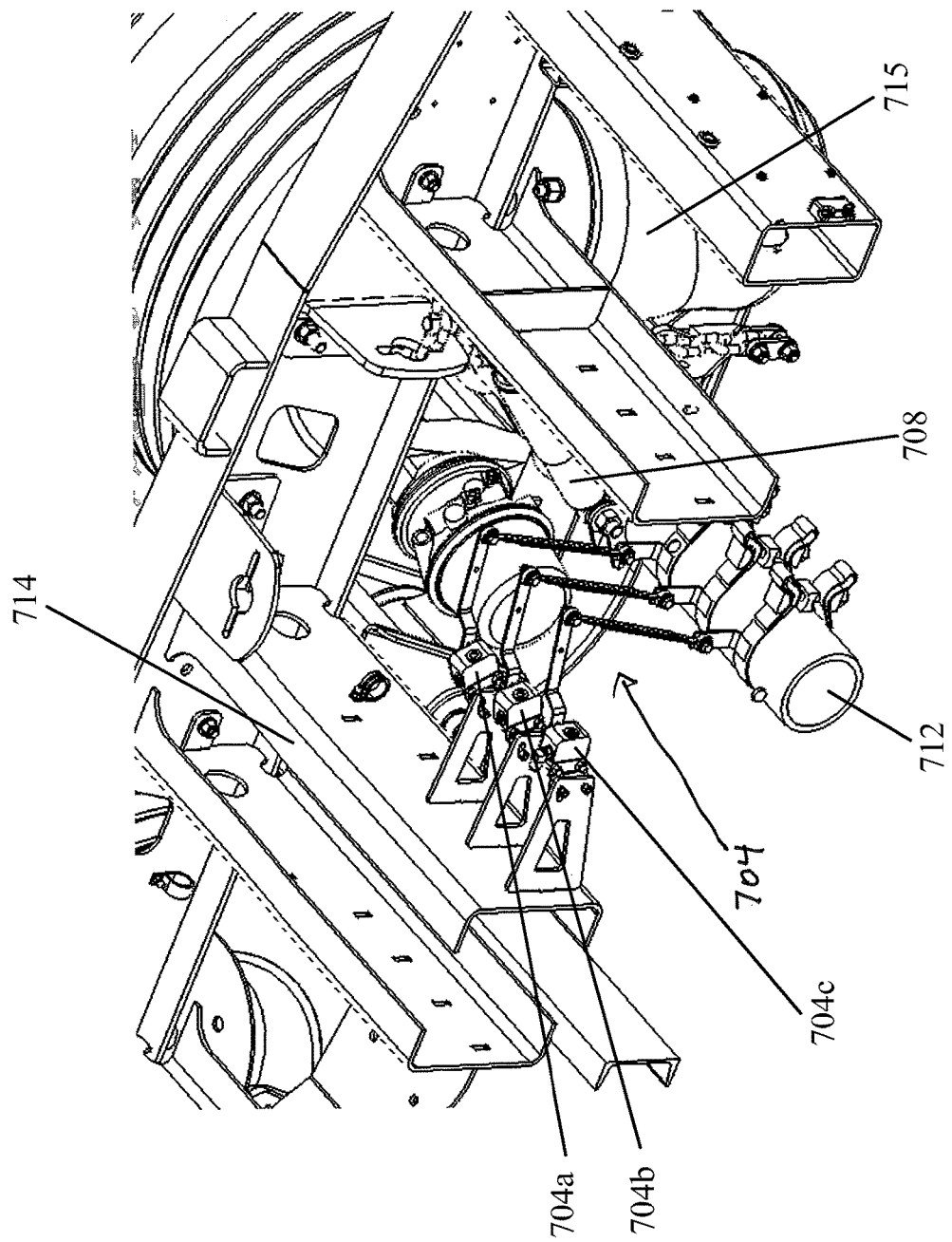
FIG. 5 is elevation view of a ride height valve assembly.

The ride height valves 704a, 704b, 704c situated at the vicinity of the booster axle 712 may be operated by mechanical linkage between the booster frame 714 and axle 712. Ride height valve assemblies 704, axle 712 and air ride suspension 715 are shown particularly in FIG. 5.

If the booster frame 714 is too high, a linkage opens a first ride height valve 704a to allow air from an air source to flow into a first hydraulic control valve 706a, via an air line (not shown to avoid obscuring other components), thereby causing the piston 710 to extend from the hydraulic cylinder 708 and increase the bias on the frame 714 as shown in FIG. 3. Many different types of air sources are possible within the scope of the description herein to those skilled in the art.

In some embodiments, the first hydraulic control valve 706a causes extension of the piston 710 by allowing a hydraulic fluid to enter the hydraulic cylinder 708 via a pump thereby extending the piston 710 therefrom. Numerous hydraulic control arrangements for initiating extension of a hydraulic piston that could be employed within the scope of the description herein to those skilled in the art.

If the frame 714 is riding too low, the linkage opens a second ride height valve 704b to allow air from an air source to flow into a second hydraulic control valve 706b, via an air line (not shown), thereby causing the piston 710 to retract into the hydraulic cylinder 708 and decrease the bias on the frame 714 as shown in FIG. 4. In some aspects, the second hydraulic control valve 706b causes retraction of the piston 710 by allowing a hydraulic fluid to exit the hydraulic cylinder 708 thereby retracting the piston 710 therefrom. Numerous hydraulic control arrangements for initiating retraction of a hydraulic piston that could be employed within the scope of the description herein to those skilled in the art.

In some aspects, a delivery air line from the second height control 704b valve provides sufficient pressure to move a normally closed directional control valve into an open position allowing hydraulic fluid to flow from the hydraulic cylinder 708 back to a reservoir. This displacement of hydraulic fluid results in movement of the hydraulic piston 710. A method of controlling the rate of flow may be passing the hydraulic fluid through a restriction in the fluid path such as an orifice. Removal of the air pressure from the height control valve will allow the directional control valve to move back to its normally closed position, stopping the flow of hydraulic fluid and thereby motion of the piston 710.

Similarly, in some embodiments, the first air control valve delivery line will provide air pressure to open a normally closed air valve, that when opened may provide system air pressure to an air over hydraulic pump. This pump may intensify the air pressure up to hydraulic pressures, e.g. 100 psi of air may result in 3000 psi of hydraulic pressure. The pump may then deliver hydraulic fluid to extend the piston 110. This supply fluid may pass through a one-way check valve or directional control valves as means of controlling the fluid flow.

The description herein is merely an example and those skilled in the art upon reviewing the description may be aware of numerous hydraulic control valve arrangements and means that effect extension and retraction of a piston in a hydraulic load biasing mechanism suitable for implementation.

The first ride height valve 704a is engaged when the axle 712 is at or greater than a first predetermined distance from the frame 714 as shown in FIG. 3. The second ride height valve 704b is engaged when the axle 712 is at or less than a second predetermined distance from the frame 714 as shown in FIG. 4. The first predetermined distance is greater than the second predetermined distance and may both define a preferred ride height range for the air ride suspension mechanism.

A third ride height valve 704c may also be provided wherein when the frame 714 is riding very low, a linkage opens the third ride height valve 704c to allow air from an air source to flow into a third hydraulic control valve 706c thereby causing the piston 710 to retract even further and at higher rate into the hydraulic cylinder 708 and decrease the bias on the frame 714. The third ride height valve 704b may be engaged when the axle 712 is at or less than a third predetermined distance from the fame 714, which is less than the second predetermined distance. Such a situation may occur when the load on the booster 700 is too high and a "bridging" event, as discussed above, is likely to occur. Similarly, to as discussed above, the third hydraulic control valve 706c may cause retraction of the piston 710 by allowing a hydraulic fluid to exit the hydraulic cylinder 708. However, as this is potentially an emergency situation, the third hydraulic control valve 706c effects the exit of hydraulic fluid at a higher rate than the second hydraulic control valve 706b thereby retracting the piston 710 quicker and alleviating the bias applied to the frame 714 quicker than the situation when piston retraction is initiated by the second hydraulic control valve 706b (and the second ride height valve 704a).

In some aspects, the third hydraulic control valve 706c functions in a similar manner to the second hydraulic control valve 706b but provides an increased flow rate by using a larger orifice. In all cases, the resulting movement of the hydraulic piston 710 may adjust the frame to axle position, and once back in the desired range the height control valves exhaust their delivery lines.

In accordance with the description herein, the ride height of the frame 714 can be maintained within the preferred ride height range for the suspension mechanism during stationary and non-stationary operations.

For example, when the trailer is loaded, the air bags of the booster 700 tends to compress, decreasing the ride height. Depending of the weight of the payload, the resulting ride height may be below the preferred ride height range, were it not for the system described herein. As such, the second ride height valve 704b is engaged as the axle 712 is at or less than a second predetermined distance from the fame 714 thereby causing the retraction of the piston 710 until the axle ride height is within the preferred ride height range. Once the axle ride height is within the preferred ride height range, the second ride height valve 704b is no longer engaged and the piston 710 ceases to retract.

Conversely, when the booster 700 is unloaded, the system can correct an overly high ride height and extend the piston 710 to provide a compensating downward bias on the booster frame 714.

Ride height valves 704a, 704b, 704c may be positioned and configured such that they are engaged when the same axle on the booster 700 is at a first, second and third predetermined distance from the frame 714. However, in some aspects, ride height valves 704a, 704b, 704c may be engaged when more than one axle is at a predetermined distance from the frame 714. For example, the first height ride valve 704a may be engaged when a first axle on the booster 700 is at a first predetermined distance from the frame 714, the second height ride valve 704b may be engaged when a second axle on the booster 700 is at a second predetermined distance from the frame 714, and the third height ride valve 704c may be engaged when a third axle on the booster 700 is at a third predetermined distance from the frame 714. In one aspect, the first, second, and third predetermined distances from the frame 714 may respectively comprise a 5.5-inch ride height, a 7.5-inch ride height, and an over 10.5-inch ride height.

The foregoing is considered as illustrative only of the principles of the invention. Further, since numerous changes and modifications will readily occur to those skilled in the art upon review of the present description and drawings, the foregoing is not desired to limit the invention to the exact construction and operation shown and described, and accordingly, all such suitable changes or modifications in structure or operation which may be resorted to are intended to fall within the scope of the claimed invention.

What is claimed is:

1. A suspension system for a trailer and a booster, the suspension system comprising:
   an air ride suspension extending between a frame of the booster and at least one axle of the booster;
   a biasing mechanism between the trailer and the frame including at least one hydraulic cylinder and a piston for providing a bias between the trailer and the frame;
   a first ride height valve configured to allow a fluid, when engaged, flowing from a fluid source to engage a first hydraulic control valve thereby causing extension of the piston to increase the magnitude of the bias, the first ride height valve is directly or indirectly engaged by a first axle of the at least one axle when the first axle is at or greater than a first predetermined distance from the frame; and
   a second ride height valve configured to allow the fluid, when engaged, flowing from the fluid source to engage a second hydraulic control valve thereby causing retraction of the piston to decrease the magnitude of the bias, the second ride height valve is directly or indirectly engaged by a second axle of the at least one axle when the second axle is at or less than a second predetermined distance from the frame.

2. The suspension system of claim 1 wherein the first axle and the second axle are configured to be a same axle.

3. The suspension system of claim 1 wherein the fluid is air and the fluid source is an air source.

4. The suspension system of claim 1 or 2 wherein the first predetermined distance and the second predetermined distance define a preferred ride height range for the air ride suspension.

5. The suspension system of claim 1 wherein the first predetermined distance is greater than the second predetermined distance.

6. The suspension system of claim 1 wherein the first hydraulic control valve causes extension of the piston by allowing a hydraulic fluid to enter the hydraulic cylinder thereby displacing the piston.

7. The suspension system of claim 6 wherein the first hydraulic control valve causes extension of the piston by further engaging a pump that causes the hydraulic fluid to enter the hydraulic cylinder thereby displacing the piston.

8. The suspension system of claim 1 wherein the second hydraulic control valve causes retraction of the piston by allowing a hydraulic fluid to exit the hydraulic cylinder thereby displacing the piston.

9. The suspension system of claim 1 further comprising a third ride height valve configured to allow the fluid, when engaged, flowing from the fluid source to engage a third hydraulic control valve thereby causing retraction of the piston to decrease the magnitude of the bias.

10. The suspension system of claim 9 wherein the fluid is air and the fluid source is an air source.

11. The suspension system of claim 9 wherein the second predetermined distance is greater than the third predetermined distance.

12. The suspension system of claim 9 wherein the second hydraulic control valve causes retraction of the piston by allowing a hydraulic fluid to exit the hydraulic cylinder at a first rate thereby displacing the piston.

13. The suspension system of claim 12 wherein the third hydraulic control valve causes retraction of the piston by allowing the hydraulic fluid to exit the hydraulic cylinder at a second rate thereby displacing the piston.

14. The suspension system of claim 13 wherein the second rate is greater than the first rate.

15. A method for controlling a ride height of a booster attached to a trailer, said booster having a frame supported by at least one air ride suspension on at least one axle, said method comprising the steps of:
  engaging a first ride height valve thereby allowing a fluid to engage a first hydraulic control valve;
  extending a piston within a hydraulic cylinder, when the first hydraulic control valve is engaged, that provides a first magnitude of a bias to said frame in relation to said axle so as to adjust said ride height;
  engaging a second ride height valve thereby allowing the fluid to engage a second hydraulic control valve;
  retracting the piston within the hydraulic cylinder, when the second hydraulic control valve is engaged, that provides a second magnitude of the bias to said frame in relation to said axle so as to adjust said ride height;
  engaging a third ride height valve thereby allowing the fluid to engage a third hydraulic control valve; and
  retracting the piston within the hydraulic cylinder, when the third hydraulic control valve is engaged, that provides a third magnitude of the bias to said frame in relation to said axle so as to adjust said ride height.

16. The method of claim 15 wherein the first magnitude of the bias is greater than that the second magnitude of the bias.

17. The method of claim 15 wherein the first magnitude of the bias is greater than that the second magnitude of the bias and the second magnitude of the bias is greater than that the third magnitude of the bias.

18. The method of claim 15 wherein:
  the first ride height valve is engaged when a first axle is at or greater than a first predetermined distance from the frame; and
  the second ride height valve is engaged when a second axle is at or less than a second predetermined distance from the frame.

19. The method of claim 18 wherein the first axle, and the second axle are configured to be a same axle.

20. The method of claim 18 wherein the first predetermined distance and the second predetermined distance define a preferred ride height range for the air ride suspension.

\* \* \* \* \*